Nov. 8, 1949

C. J. HAHN 2,487,128

ADAPTER HUB

Filed May 23, 1945

Clarence J. Hahn
INVENTOR

BY
ATTORNEY

Patented Nov. 8, 1949

2,487,128

UNITED STATES PATENT OFFICE 2,487,128

ADAPTER HUB

Clarence J. Hahn, Buffalo, N. Y., assignor to Worthington Pump and Machinery Corporation, Harrison, N. J., a corporation of Delaware Application May 23, 1945, Serial No. 595,461

6 Claims. (Cl. 287—53)

This invention relates to rotative power transmitting devices, and more particularly to a hub structure for adapting such rotative devices to shafts of different diameters. Stock sheaves are manufactured in certain standard sizes, both with respect to different sheave diameters for a given shaft diameter, and different shaft diameters for a sheave of given diameter. For that reason dealers in stock sheaves are required to carry an enormous supply on hand in order to meet the needs of the trade, particularly in connection with fractional horsepower stock. Simplification in matters of production and reduction in the number of sheave units which are required to make up the essential supply on hand reside in the adaptation of stock sheaves of a given diameter or of different diameters to a large range of shaft diameters.

Accordingly, an object of the present invention is to provide an adapter hub which is of such design as to facilitate the mounting of standardized rotative power transmitting devices to a large range of shaft diameters.

A further object is to provide an adapter hub for mounting rotative power transmitting devices on shafts of various diameters, in which the construction is such as to effectively secure the adapter hub to the associated shaft, and the rotative power transmitting body or device to the adapter, and in which the fastening means are so arranged as to facilitate separation of the parts one from the other, as when making necessary repairs or substitution of parts.

With these and other objects in view, as may appear from the accompanying specification, the invention consists of various features of construction and combination of parts, which will be first described in connection with the accompanying drawings, showing an adapter hub of a preferred form embodying the invention, and the features forming the invention will be specifically pointed out in the claims.

Figure 1:
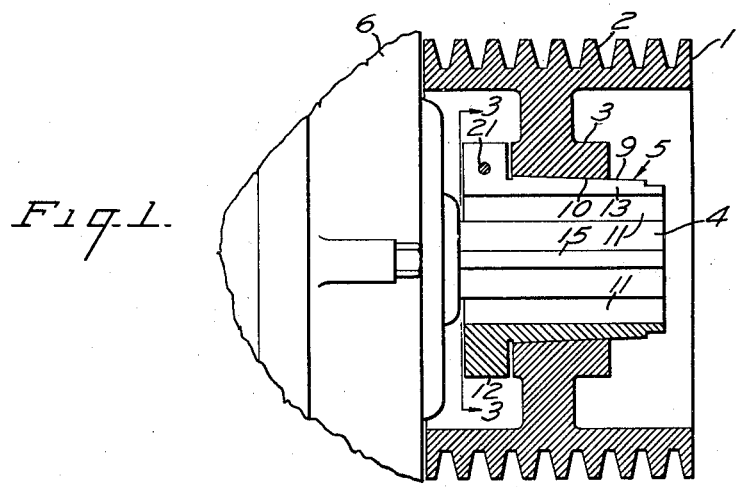
Figure 1 is a sectional view of a conventional sheave illustrating the adapter hub applied thereto for mounting the sheave on its drive shaft.
Figure 2:
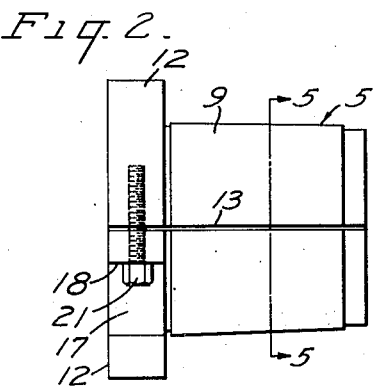
Figure 2 is an elevational view of the adapter hub.

Referring to Figure 1, the sheave 1 is provided with peripheral grooves 2 for co-action with conventional V-belts. The sheave includes a hub part 3 which is fixedly mounted on a drive shaft 4 through the medium of an adapter hub 5. A motor is indicated fragmentarily at 6 for driving the shaft 4.

Figure 4:
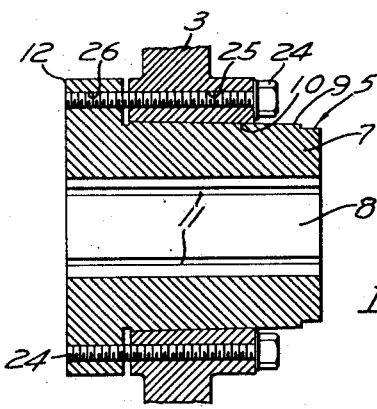
Figure 4 is a sectional view taken along the line 4—4 of Figure 3.
Figure 5:
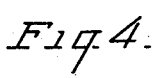
Figure 5 is a sectional view taken along the line 5—5 of Figure 2.

Referring to Figures 4 and 5, the adapter hub 5 includes a body 7 which is provided with a bore 8 for the reception of the shaft 4. The body 7 is provided with a tapered outside face 9 which is circular in cross-section and extends throughout the greater length of the body 7. Similarly, the hub part 3 of the sheave 1 is provided with a tapered axial bore 10, this taper conforming to that of the face 9.

As shown in Figure 5, the body 7 is of considerable thickness and is provided with four grooves 11 which parallel the axis of the bore 8 and open into the bore. All the grooves 11 are of equal depth and are equally spaced one from the other circumferentially of the bore 8. All the grooves extend throughout the full length of the adapter hub 5, including the attaching flange 12 at the larger end of the body 7. In addition, the adapter hub 5 is provided with a longitudinal slot 13 which extends from end to end of the body 7 and also through the flange 12. This slot is preferably located in the radial plane of one of the grooves 11.

A keyway 14 is provided in the body 7 for the reception of a key 15 which is lodged in the usual keyway 16 in the drive shaft 4 and set screw 28 is threaded through the flange 12 and into clamping engagement with the key 15.

Figure 3:
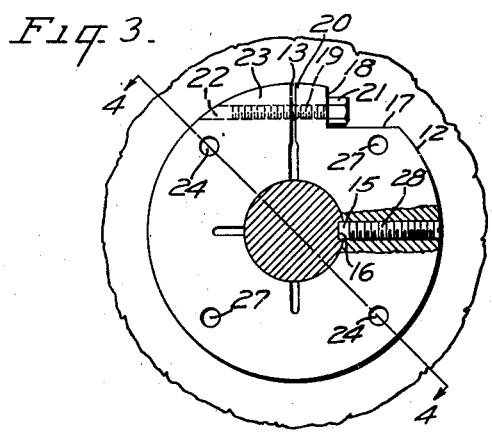
Figure 3 is a view taken from the position indicated by line 3—3 of Figure 1.

According to Figure 3, the flange 12 is cut away at 17 to provide a face 18 which parallels the slot 13. A bore 19 is provided in the end part 20 formed by the recess 17 for the reception of a bolt 21, which bolt is threaded into a bore 22 in the second end part 23 of the flange 12.

In operation, the bore 8 may or may not fit the drive shaft 4. Should the bore 8 be of smaller diameter than the drive shaft 4, the bore 8 is enlarged by reaming out sufficient material to bring the bore to the necessary shaft-receiving diameter. The adapter hub 5 is then mounted on the drive shaft 4 and the screw or bolt 21 is tightened to firmly secure the adapter hub to the drive shaft. Because of the grooves 11, the body 7 is weakened in such a degree as to respond easily to the contracting forces incident to tightening of the bolt. The hub part 3 is then inserted over the small end of the adapter hub 5, and the hub part is drawn home through the medium of two bolts or screws 24. These bolts pass loosely through bores 25 in the hub part 3 but are threaded into bores 26 in the flange 12. Because of the co-acting tapers on the hub part 3 and the adapter hub 5, tightening of the bolts 24 draws the hub part 3 onto the body 7 to establish a firm connection between the two parts, in addition to accurately centering the sheave 1 with respect to the axis of rotation of the shaft 4. Screws 24 also provide key means which prevent relative rotation of the hub part 3 with respect to the adapter hub 5, in addition to constituting an effective means for establishing a firm pressure relationship between these two parts. The key 15 is driven into place after the other parts of the drive have been made secure, although the key 15 may be inserted a short distance in the two keyways in order to hold the adapter hub 5 in place on the drive shaft. It is advisable to drive the key home after the other parts of the drive structure have been firmly secured one to the other so as not to resist any contracting action of the adapter hub.

In an adapter hub structure such as that shown in Figures 4 and 5, the wall constituting the body 7 is of such thickness as to permit considerable material to be reamed out of the body for accommodating shafts of larger diameters. In actual practice, the adapter hub 5 is provided with a shaft-receiving bore 8 of minimum diameter, and the adapter hub is reamed out to accommodate shafts of larger diameters up to a predetermined maximum shaft diameter. All the material down cient frictional relationship with the shaft 4. Such weakening of the wall 7, including the flange to the radial depth of the grooves 11 may be removed for shaft opening enlarging purposes. Thus an adapter hub of given size may accommodate a large range of shaft diameters, the outside diameter of the adapter hub being standardized with respect to the bore 10 in the hub part 3. In other words, a single adapter hub 5 is designed for co-action with the bores 10 in sheaves of different diameters and within a large range of such diameters.

Because of the multiplicity of grooves 11, the wall 7 is weakened along predetermined lines so as to flex easily into an effective clamping relationship with the shaft inserted in the bore 8. The grooves are of such number and distribution as to provide an effective bending of the wall 7 to bring all wall face surfaces of the bore 8 into effi- 12, provides a wall structure which operates to constantly maintain uniform gripping pressure in a detachable and split adapter hub structure, in addition to adapting the hub structure to a large range of bores within the limits of the grooves 11.

Additional threaded bores 27 are provided for bolts which may be threaded against the hub part 3 to separate the two hub parts.

It will be understood that the invention is not to be limited to the specific construction or arrangement of parts shown, but that they may be widely modified within the invention defined by the claims.

What is claimed is:

1. In a power transmitting device, a rotative shaft, a hub member having a tapered axial bore, an adapter hub for securing said hub member to said shaft, said adapter hub having a shaft-receiving bore for receiving said rotative shaft and a tapered face frictionally engaging the wall face of said axial bore, said adapter hub having a plurality of shaft engaging portions flexibly connected together, means for shifting said hub member relatively to said adapter hub for wedging said portions between the hub member and said rotative shaft to fixedly secure the adapter hub to the rotative shaft and the hub member to the adapter hub, and said adapter hub being provided with longitudinal grooves opening into said shaft-receiving bore for defining said portions.

2. An adapter hub for shafts comprising an annular externally tapered member having an attaching flange and a shaft receiving bore, the wall of said member having a plurality of longitudinal slots opening into said bore, one of said slots extending to the outer surface of said member whereby the member is split.

3. An adapter hub for shafts comprising an annular externally tapered member having an attaching flange and a shaft receiving bore, the wall of said member having a plurality of slots parallel to the axis of said member and opening into said bore, one of said slots extending to the outer surface of said member whereby the member is split.

4. An adapter hub for shafts comprising an annular externally tapered member having a shaft receiving bore, the wall of said member having a plurality of longitudinal slots opening into said bore.

5. In a mounting for shafts, a shaft, a hub member to be connected to said shaft and having a tapered bore, a sleeve member externally tapered to seat in said bore, said sleeve member having a shaft receiving bore, a plurality of circumferentially spaced longitudinal slots opening into said shaft receiving bore, one of said slots splitting said sleeve member, and means for connecting said sleeve member to said hub member.

6. In a demountable connection for shafts, a shaft, a hub member to be connected to said shaft and having a tapered bore, a flanged sleeve-like adapter hub member externally tapered to seat in said bore, said adapter member having a shaft receiving bore, a plurality of longitudinal slots opening into said shaft receiving bore, one of said slots splitting said adapter member, means for connecting the flange of said adapter member to said hub member, and means for contracting said shaft receiving bore by reducing the width of said slots, said last mentioned means comprising said first mentioned means and transversely acting threaded means connecting adjacent portions of said adapter member separated by the splitting slot.

CLARENCE J. HAHN.

REFERENCES CITED

The following references are of record in the file of this patent:

UNITED STATES PATENTS

| Number | Name | Date |
|---|---|---|
| Re. 22,485 | Otto | May 23, 1944 |
| 1,116,845 | Rogers | May 10, 1914 |
| 1,356,101 | Waugh | Oct. 19, 1920 |
| 2,157,838 | Warner | May 9, 1939 |
| 2,377,046 | Siegerist | May 29, 1945 |
| 2,381,697 | Shephard | Aug. 7, 1945 |
| 2,396,414 | Firth | Mar. 12, 1946 |

Certificate of Correction

November 8, 1949

Patent No. 2,487,128

CLARENCE J. HAHN

It is hereby certified that errors appear in the printed specification of the above numbered patent requiring correction as follows:

Column 3, lines 32 and 33, strike out the syllable and words "cient frictional relationship with the shaft 4. Such weakening of the wall 7, including the flange" and insert the same before the reference numeral "12" in line 51, same column; and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*